United States Patent
Tsunemori et al.

(10) Patent No.: US 11,639,763 B2
(45) Date of Patent: May 2, 2023

(54) EXPANSION PIPE JOINT AND INCINERATION ASH TREATMENT FACILITY

(71) Applicant: KAWASAKI JUKOGYO KABUSHIKI KAISHA, Kobe (JP)

(72) Inventors: Keita Tsunemori, Kobe (JP); Munehiro Kikuta, Kobe (JP); Kazuya Tamaki, Takatsuki (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 590 days.

(21) Appl. No.: 16/499,471

(22) PCT Filed: Mar. 23, 2018

(86) PCT No.: PCT/JP2018/011649
§ 371 (c)(1),
(2) Date: Sep. 30, 2019

(87) PCT Pub. No.: WO2018/180967
PCT Pub. Date: Oct. 4, 2018

(65) Prior Publication Data
US 2020/0386353 A1       Dec. 10, 2020

(30) Foreign Application Priority Data

Mar. 31, 2017   (JP) .............................. JP2017-071044

(51) Int. Cl.
*F16L 27/10* (2006.01)
*F23J 1/00* (2006.01)
(Continued)

(52) U.S. Cl.
CPC ............. *F16L 27/1012* (2013.01); *F23J 1/00* (2013.01); *F16L 27/111* (2013.01); *F16L 55/24* (2013.01);
(Continued)

(58) Field of Classification Search
CPC . F16L 27/107; F16L 27/1012; F16L 27/1025; F16L 27/108; F23J 2700/001; F23J 2700/002; F23J 2700/003
(Continued)

(56) References Cited

U.S. PATENT DOCUMENTS 1,076,738 A * 10/1913 Berry ..................... F16L 27/111
285/224
2,419,750 A *  4/1947 Wiberg ................. F16L 27/113
285/225
(Continued)

FOREIGN PATENT DOCUMENTS

DE    20-2013-000867 U1    1/2014
JP          S56-071582 U    6/1981
(Continued)

OTHER PUBLICATIONS

Jun. 12, 2018 Search Report issued in International Patent Application No. PCT/JP2018/011649.
(Continued)

*Primary Examiner* — David Bochna
(74) *Attorney, Agent, or Firm* — Oliff PLC

(57) ABSTRACT

An expansion pipe joint that absorbs displacement occurring at a connection portion between an upstream pipe and a downstream pipe includes an outer tube having a downstream end coupled to the downstream pipe, an inner tube that is inserted into the outer tube and has an upstream end coupled to the upstream pipe, and a closing member having elasticity that is provided between an upstream end of the outer tube and the upstream end of the inner tube so as to close a gap between them. Then, a difference between a position in an axial direction of the upstream end of the outer tube and a position in the axial direction of the upstream end of the inner tube is within a predetermined range so that a
(Continued)

bus line of the closing member is inclined from the axial direction.

5 Claims, 7 Drawing Sheets

(51) Int. Cl.
*F16L 27/111* (2006.01)
*F16L 55/24* (2006.01)

(52) U.S. Cl.
CPC .... *F23J 2700/001* (2013.01); *F23J 2700/003* (2013.01)

(58) Field of Classification Search
USPC .......................... 285/16, 229, 424, 302, 237
See application file for complete search history.

(56) References Cited

U.S. PATENT DOCUMENTS

| | | | | |
|---|---|---|---|---|
| 3,669,471 A | * | 6/1972 | Fetish, Jr. | ........... F16L 55/0337 285/225 |
| 3,837,178 A | * | 9/1974 | Hackforth | ................. F16D 3/78 285/200 |
| 4,251,354 A | * | 2/1981 | Lower | ..................... F16L 27/00 209/371 |
| 4,627,625 A | * | 12/1986 | Johnson | ................. F16J 15/363 277/627 |
| 4,732,413 A | * | 3/1988 | Bachmann | ............ F16L 27/108 285/236 |
| 4,804,211 A | * | 2/1989 | Larson | ..................... F16J 15/52 464/170 |
| 5,259,511 A | * | 11/1993 | Pierson | ..................... B07B 1/46 138/120 |
| 5,443,290 A | * | 8/1995 | Boyer | ..................... F16L 27/12 285/379 |
| 5,887,726 A | * | 3/1999 | Mitchell | ................ B07B 13/16 209/243 |
| 6,402,203 B1 | * | 6/2002 | Mathiesen | .............. F16L 25/12 285/224 |

FOREIGN PATENT DOCUMENTS

| | | |
|---|---|---|
| JP | S60-60394 A | 4/1985 |
| JP | S62-143018 U | 9/1987 |
| JP | S64-015029 U | 1/1989 |
| JP | 2005-29342 A | 2/2005 |
| JP | 2005-219864 A | 8/2005 |
| JP | 2012-117607 A | 6/2012 |
| KR | 10-2004-0012034 A | 2/2004 |
| NL | 1021920 C2 | 5/2004 |

OTHER PUBLICATIONS

Dec. 7, 2020 Extended Search Report issued in European Patent Application No. 18775850.3.

* cited by examiner

EXPANSION PIPE JOINT AND INCINERATION ASH TREATMENT FACILITY

TECHNICAL FIELD

The present invention relates to an expansion pipe joint that absorbs displacement occurring between connected pipes at a connection portion provided in a location where a conveyed object is conveyed by gravity in a pipe system that conveys powdery and granular conveyed objects, and relates to an incineration ash treatment facility using the expansion pipe joint.

BACKGROUND ART

FIG. 1 shows a schematic configuration of an incineration ash treatment facility 7 that performs pulverization treatment of incineration ash generated in, for example, a coal fired boiler, a garbage incinerator, and the like. The incineration ash treatment facility 7 shown in FIG. 1 includes a crusher 75 that finely crushes incineration ash, a conveyor 74 that conveys the incineration ash to the crusher 75, and a hopper 76 that stores the incineration ash crushed by the crusher 75.

In the incineration ash treatment facility 7 described above, a vibration mill is used as the crusher 75. Generally, in a vibration mill, a drum (crushing cylinder) is vibrated at high speed to move a pulverizing medium and a material to be pulverized in the drum, so that the material to be pulverized is finely pulverized. Since the crusher 75 vibrates greatly due to its characteristics, an expansion pipe joint 10 that absorbs displacement occurring at a connection portion between an inlet pipe 78 of the crusher 75 and a pipe 77 connected to an outlet of the conveyor 74 is provided at the connection portion. PTLs 1 and 2 disclose this type of expansion pipe joint.

The expansion pipe joint described in PTL 1 includes a lap joint inserted in a loose flange, a cylindrical portion inserted in the lap joint, an inner tube whose upper part is swingably connected to the cylindrical portion, an outer tube in which the lower part of the inner tube is inserted, and a bellows that connects the lap joint and the outer tube and covers the outer periphery of the inner tube.

The expansion pipe joint described in PTL 2 includes an inner tube (chute) in which a conveyance path is formed on the inner periphery, a cylindrical bellows covering the outer periphery of the inner tube, and bead rings to which both ends of the bellows are fixed. One bead ring is connected to a pipe on an upstream side together with a flange portion of the inner tube, and the other bead ring is connected to a pipe on a downstream side.

CITATIONS LIST

Patent Literature

PTL 1: JP 2012-117607 A
PTL 2: JP 2005-219864 A

SUMMARY OF INVENTION

Technical Problem

In the expansion pipe joints of PTLs 1 and 2, the inner tube prevents contact between the bellows and the powder or fluid conveyed. However, if the supply of incineration ash to the crusher becomes excessive, the incineration ash that cannot flow out to the crusher remains in the expansion pipe joint, and the incineration ash may enter between the inner tube and the bellows. When the bellows and the high-temperature incineration ash come into contact in this manner, the bellows made from rubber is deteriorated by heat. Further, when vibration is applied to the expansion pipe joint in a state where the bellows and the incineration ash are in contact with each other, the bellows are worn or cracked by friction with the incineration ash. Furthermore, in the crusher, the vibration related to the expansion pipe joint during operation is regular pitching. However, when the operation is stopped, resonance occurs and a tensile force acts on the bellows. As a result, the bellows breaks in a few months, and the bellows is frequently replaced.

The present invention has been made in view of the above circumstances, and an object of the present invention is to propose a technique of extending the service life of an expansion pipe joint that is used in a pipe system that conveys a powdery or granular conveyed object and absorbs displacement occurring at a connection portion between pipes.

Solution to Problem

According to an aspect of the present invention, there is provided an expansion pipe joint that absorbs displacement occurring at a connection portion between an upstream pipe and a downstream pipe where a powdery and/or granular conveyed object is conveyed by gravity. The expansion pipe joint includes an outer tube having a downstream end coupled to the downstream pipe, an inner tube that is inserted into the outer tube and has an upstream end coupled to the upstream pipe, and a closing member having elasticity that is provided between an upstream end of the outer tube and the upstream end of the inner tube so as to close a gap between them. A difference between a position in an axial direction of the upstream end of the outer tube and a position in the axial direction of the upstream end of the inner tube is within a predetermined range so that a bus line of the closing member is inclined from the axial direction.

In the above expansion pipe joint, the position in the axial direction of the upstream end of the outer tube and the position in the axial direction of the upstream end of the inner tube may be substantially the same.

Further, according to another aspect of the present invention, there is provided an incineration ash treatment facility including a vibration device for treating incineration ash, a pipe for sending the incineration ash to the vibration device, and the expansion pipe joint provided between an outlet of the pipe and an inlet of the vibration device.

In the expansion pipe joint and the incineration ash treatment facility, a distance in the axial direction between the closing member of the expansion pipe joint and the downstream end of the outer tube, which is the downstream end of the expansion pipe joint, can be further increased. In this manner, contact between the conveyed object that overflows from the downstream pipe into the expansion pipe joint and the closing member can be avoided, and physical, chemical, and thermal influences that the closing member receives from the conveyed object can be suppressed. As a result, deterioration of the closing member can be suppressed, and the service life of the expansion pipe joint can be extended.

Further, in the expansion pipe joint, the outer tube may have an upper flange provided at the upstream end of the outer tube, a lower flange provided at the downstream end of the outer tube and having a smaller inner diameter than the upper flange, and a body having a tapered shape connecting the upper flange and the lower flange.

In this manner, the conveyed object overflowing to the expansion pipe joint can be returned to the downstream pipe from the outer tube while a displaceable range in a direction perpendicular to the axial direction of the outer tube relative to the inner tube is ensured.

In the expansion pipe joint, a supply pipe for supplying a fluid between the outer tube and the inner tube and/or a discharge pipe for discharging a fluid from between the outer tube and the inner tube may be connected to a portion between the upstream end and a central portion in the axial direction of the outer tube.

In this manner, a fluid can be supplied to the air gap between the outer tube and the inner tube through the supply pipe, or a fluid can be discharged from the air gap between the outer tube and the inner tube through the discharge pipe.

Further, in the expansion pipe joint, the internal monitoring system may be provided between the upstream end and the central portion in the axial direction of the outer tube.

In this manner, it is possible to observe and monitor the gap between the outer tube and the inner tube, which have conventionally been a black box, using the internal monitoring system without disassembling the expansion pipe joint.

Further, in the expansion pipe joint, the inner tube or the outer tube may be provided with an intrusion prevention member that closes a gap between the outer tube and the inner tube and prevents the conveyed object from intruding the gap between them.

In this manner, the intrusion of the conveyed object into the gap between the outer tube and the inner tube can be prevented.

Advantageous Effects of Invention

According to the present invention, a technique of extending the service life of an expansion pipe joint that is used in a pipe system that conveys a powdery or granular conveyed object and absorbs displacement occurring at a connection portion between pipes can be proposed.

DESCRIPTION OF EMBODIMENTS

Figure 1:
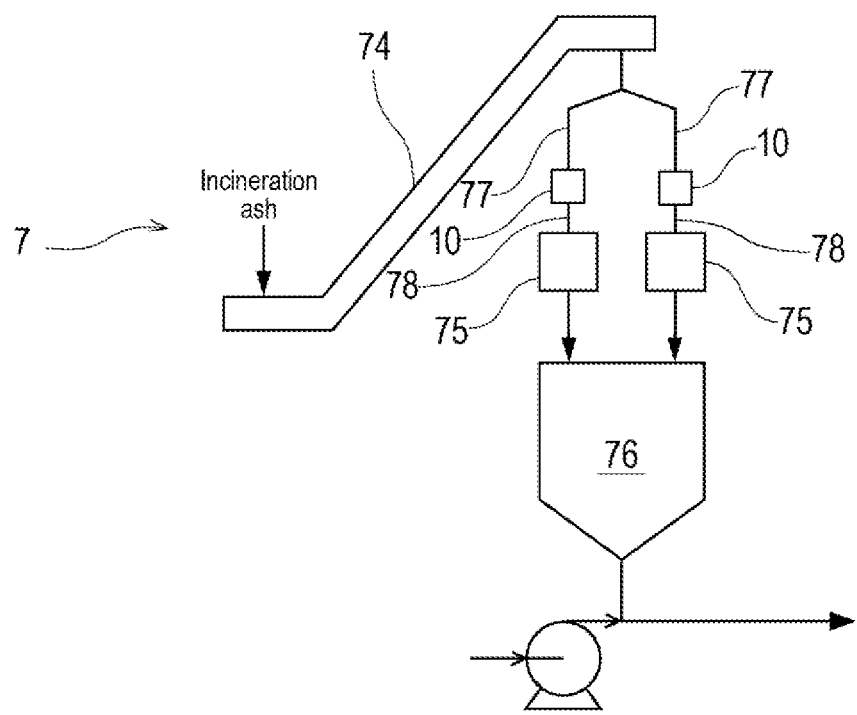
FIG. 1 is a diagram showing a schematic configuration of an incineration ash treatment facility.

Next, an embodiment of the present invention will be described with reference to the drawings. FIG. 1 is a diagram showing a schematic configuration of an incineration ash treatment facility 7 that employs an expansion pipe joint 10 according to an embodiment of the present invention. The incineration ash treatment facility 7 performs processing of finely crushing incineration ash generated in, for example, a coal fired boiler, a garbage incinerator, and the like.

The incineration ash treatment facility 7 shown in FIG. 1 includes a crusher 75, a conveyor 74 that conveys the incineration ash to the crusher 75, and a hopper 76 in which the incineration ash crushed by the crusher 75 is thrown.

The conveyor 74 and the crusher 75 are connected by a pipe system that conveys granular or gravel-like incineration ash. This pipe system includes a vibration pipe 78 coupled to an inlet of the crusher 75, a fixed pipe 77 provided on the upstream side of the vibration pipe 78, and the expansion pipe joint 10 that connects the fixed pipe 77 and the vibration pipe 78. Note that, in the description and claims, "upstream" and "downstream" respectively correspond to upstream and downstream in a flow direction of the conveyed object (incineration ash) conveyed by the pipe system. The fixed pipe 77 is an "upstream pipe" when viewed from the expansion pipe joint 10, and the vibration pipe 78 is a "downstream pipe" when viewed from the expansion pipe joint 10.

The fixed pipe 77 is fixed to a structure (not shown) in which upstream side equipment (for example, the conveyor 74 or equipment used for other coal processing not shown) of the crusher 75 is installed. On the other hand, the vibration pipe 78 vibrates with the vibration of the drum of the crusher 75. For this reason, displacement due to the vibration of the vibration pipe 78 occurs at the connection portion between the fixed pipe 77 and the vibration pipe 78. The expansion pipe joint 10 absorbs the displacement occurring at the connection portion between the fixed pipe 77 and the vibration pipe 78. Note that the expansion pipe joint 10 according to the present invention is applicable also in a case where both the fixed pipe 77 and the vibration pipe 78 are movable.

Figure 2:
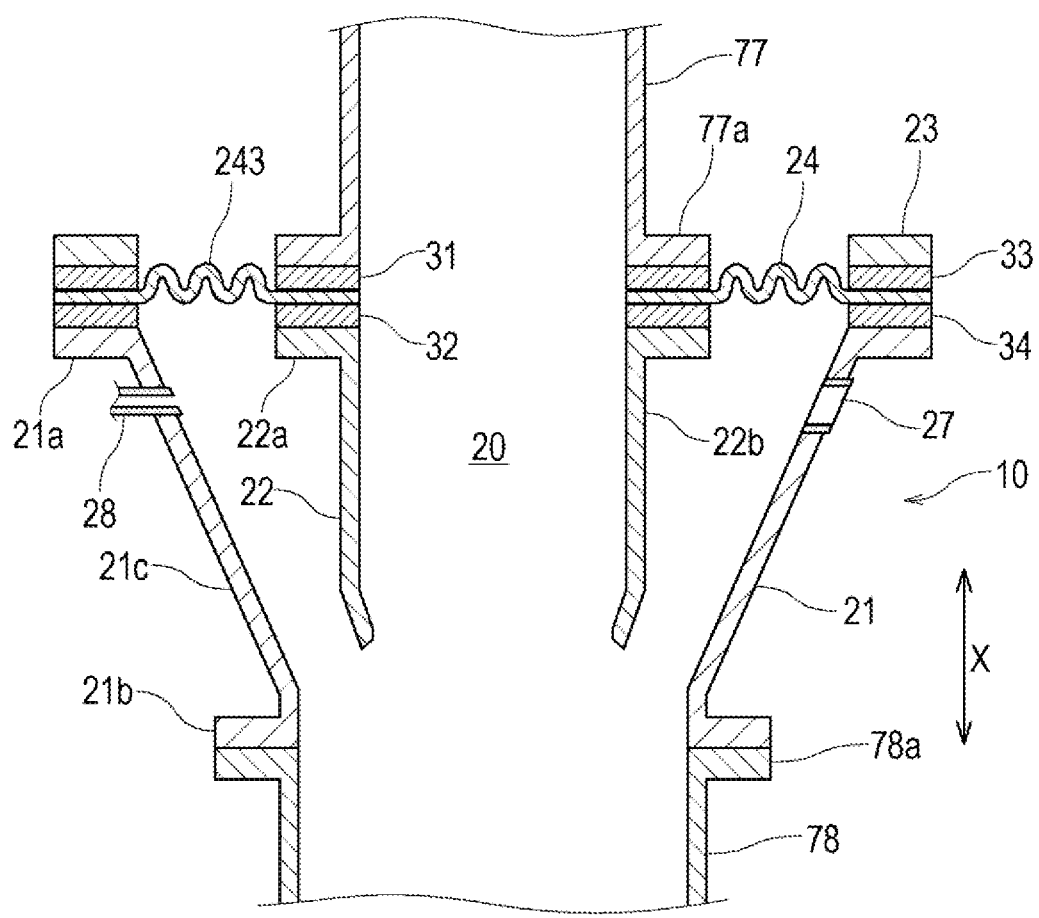
FIG. 2 is an end view of a cut portion where an expansion pipe joint according to an embodiment of the present invention is cut along a plane passing through a central axis.

Hereinafter, a detailed configuration of the expansion pipe joint 10 will be described. FIG. 2 is an end view of a cut portion where the expansion pipe joint 10 according to an embodiment of the present invention is cut along a plane passing through a central axis. Note that, in a state where the vibration pipe 78 is stationary, the expansion pipe joint 10 is a rotating body, and a direction parallel to an extending direction of the axis of rotation of this rotating body is referred to as the "axial direction X" of the expansion pipe joint 10, and an axis of rotation of the rotating body is referred to as the "central axis" of the expansion pipe joint 10. The expansion pipe joint 10 is disposed in the pipe system so that the axial direction X and the flow direction of a conveyed object are parallel to each other.

The expansion pipe joint 10 shown in FIG. 2 is configured with an outer tube 21, an inner tube 22 inserted in the outer tube 21, and a closing member 24 that closes the space between the outer tube 21 and the inner tube 22. The inside of the inner tube 22 serves as a conveyance path 20 for a conveyed object in the expansion pipe joint 10.

The outer tube 21 is a metal cylindrical body extending in the axial direction X, and includes an upper flange 21a provided at the upstream end of the outer tube, a lower flange 21b provided at a downstream end, and a body 21c that connects the upper flange 21a and the lower flange 21b.

The lower flange 21b of the outer tube 21 is coupled to an inlet flange 78a provided at an upstream end of the vibration pipe 78 with a bolt or the like. Accordingly, the outer tube 21 is displaced integrally with the vibration pipe 78.

An inner diameter of the upper flange 21a is larger than an inner diameter of the lower flange 21b. The body 21c has a tapered shape with a narrowed bottom that smoothly connects the upper flange 21a and the lower flange 21b having different inner diameters as described above. In the outer tube 21, a conveyed object can be quickly moved or conveyed from the outer tube 21 to the vibration pipe 78 while a displaceable range in a direction perpendicular to the axial direction X of the outer tube 21 with respect to the inner tube 22 is ensured.

The inner tube 22 is a metal cylindrical body extending in the axial direction X, and includes an upper flange 22a provided at the upstream end of the inner tube 22 and a body 22b. The upper flange 22a of the inner tube 22 is coupled to an outlet flange 77a provided at a downstream end of the fixed pipe 77 with a bolt or the like.

Figure 7:
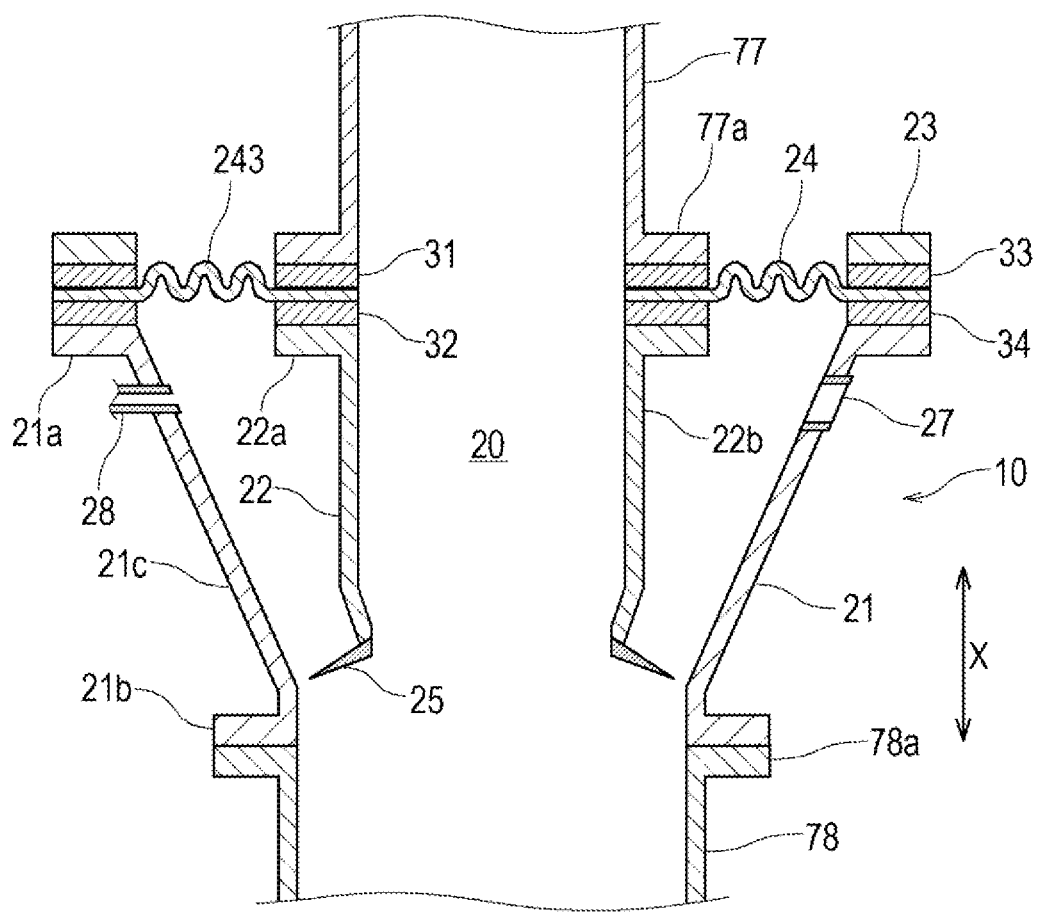
FIG. 7 is an end view of a cut portion where an expansion pipe joint provided with an intrusion prevention member is cut along a plane passing through a central axis.

A position in the axial direction X of the downstream end of the body 22b of the inner tube 22 is slightly upstream of a position in the axial direction X of the lower flange 21b of the outer tube 21. An outer diameter of the body 22b of the inner tube 22 is smaller than the inner diameter of the lower flange 21b of the outer tube 21. Accordingly, a gap in a radial direction exists between the inner periphery of the outer tube 21 and the outer periphery of the inner tube 22 inserted substantially concentrically in the outer tube 21. The size of the gap is preferably larger than the maximum displacement in the horizontal direction of the outer tube 21 with respect to the inner tube 22 at the downstream end of the inner tube 22 in order to avoid interference between the inner tube 22 and the outer tube 21 at the time of displacement. The gap may be an air gap. However, as shown in FIG. 7, an intrusion prevention member 25 made from a material that can be elastically deformed and/or follows displacement, such as rubber, may be provided in the gap. The intrusion prevention member 25 may be provided at the downstream end of the inner tube 22 or in the vicinity of the downstream end, or may be provided on the outer tube 21. Alternatively, the intrusion prevention member 25 may be bridged between the downstream end of the inner tube 22 or the vicinity of the downstream end and the inner periphery of the outer tube 21. In the example shown in FIG. 7, the intrusion prevention member 25 has an annular shape that is continuous or discontinuous in the circumferential direction in plan view, and an inner peripheral edge of the intrusion prevention member 25 is fixed to the downstream end of the inner tube 21.

Figure 3:
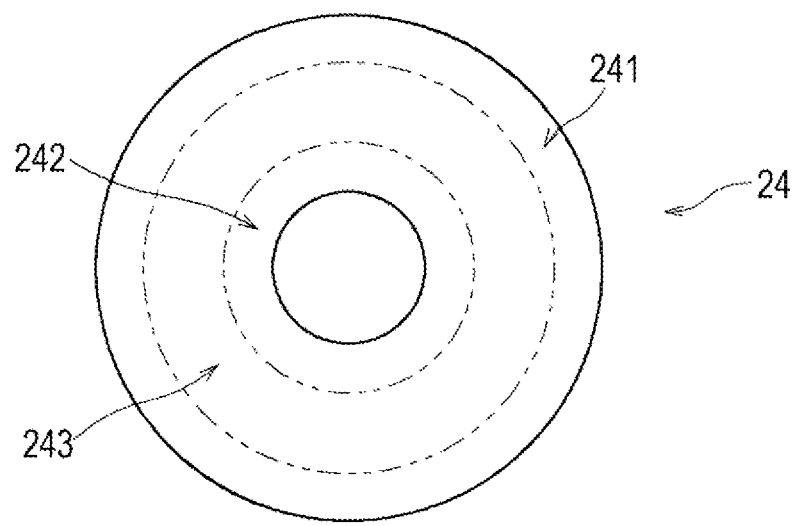
FIG. 3 is a view of a closing member as viewed from an axial direction.

FIG. 3 is a view of the closing member 24 as viewed from the axial direction X. As shown in FIGS. 2 and 3, the closing member 24 has a hollow disk shape in plan view. An inner diameter of the closing member 24 is substantially the same as the inner diameter of the upper flange 22a of the inner tube 22. Further, an outer diameter of the closing member 24 is substantially the same as the outer diameter of the upper flange 21a of the outer tube 21. However, the outer diameter of the closing member 24 may be smaller or larger than the outer diameter of the upper flange 21a of the outer tube 21, as long as the outer diameter is large enough to sandwich an outer edge of the closing member 24 between the upper flange 21a of the outer tube 21 and a fixing ring 23.

The closing member 24 is provided between the upper flange 21a and the upper flange 22a so as to close the gap between the upper flange 21a provided at the upstream end of the outer tube 21 and the upper flange 22a provided at the upstream end of the inner tube 22. In the expansion pipe joint 10 configured as described above, the position in the axial direction X of the upper flange 22a of the inner tube 22 and the position in the axial direction X of the upper flange 21a of the outer tube 21 are substantially the same in a state where the vibration pipe 78 is stationary.

In the closing member 24, an outer mounting portion 241, an expansion and contraction portion 243, and an inner mounting portion 242 are integrally formed in this order from the outer peripheral side.

The outer mounting portion 241 is sandwiched between the upper flange 21a of the outer tube 21 and the fixing ring 23 with gaskets 33 and 34 provided between them, and is coupled to the upper flange 21a of the outer tube 21. The upper flange 21a, the gaskets 33 and 34, the outer mounting portion 241 of the closing member 24, and the fixing ring 23 are fastened by a fastener, such as a bolt (not shown). Note that, in a case where the closing member 24 is formed of a material that is sandwiched between the upper flange 21a and the fixing ring 23 and can be compressed and deformed, such as rubber, the gaskets 33 and 34 may be omitted.

The inner mounting portion 242 is sandwiched between the upper flange 22a of the inner tube 22 and the outlet flange 77a of the fixed pipe 77 with gaskets 31 and 32 provided between them, and is coupled to the upper flange 22a of the inner tube 22. The upper flange 22a, the gaskets 31 and 32, the inner mounting portion 242 of the closing member 24, and the outlet flange 77a are fastened by a fastener, such as a bolt (not shown). Note that, in a case where the closing member 24 is formed of a material that is sandwiched between the upper flange 22a and the outlet flange 77a and can be compressed and deformed, such as rubber, the gaskets 31 and 32 may be omitted.

The expansion and contraction portion 243 expands and contracts to absorb the displacement in the axial direction X and the radial direction of the outer mounting portion 241 relative to the inner mounting portion 242. The expansion and contraction portion 243 shown in FIG. 2 is made from rubber, resin, or cloth, and has a bellows formed in the radial direction. When the conveyed object is at a high temperature as in the present embodiment, the expansion and contraction portion 243 is made from a material having heat resistance.

Figure 4:
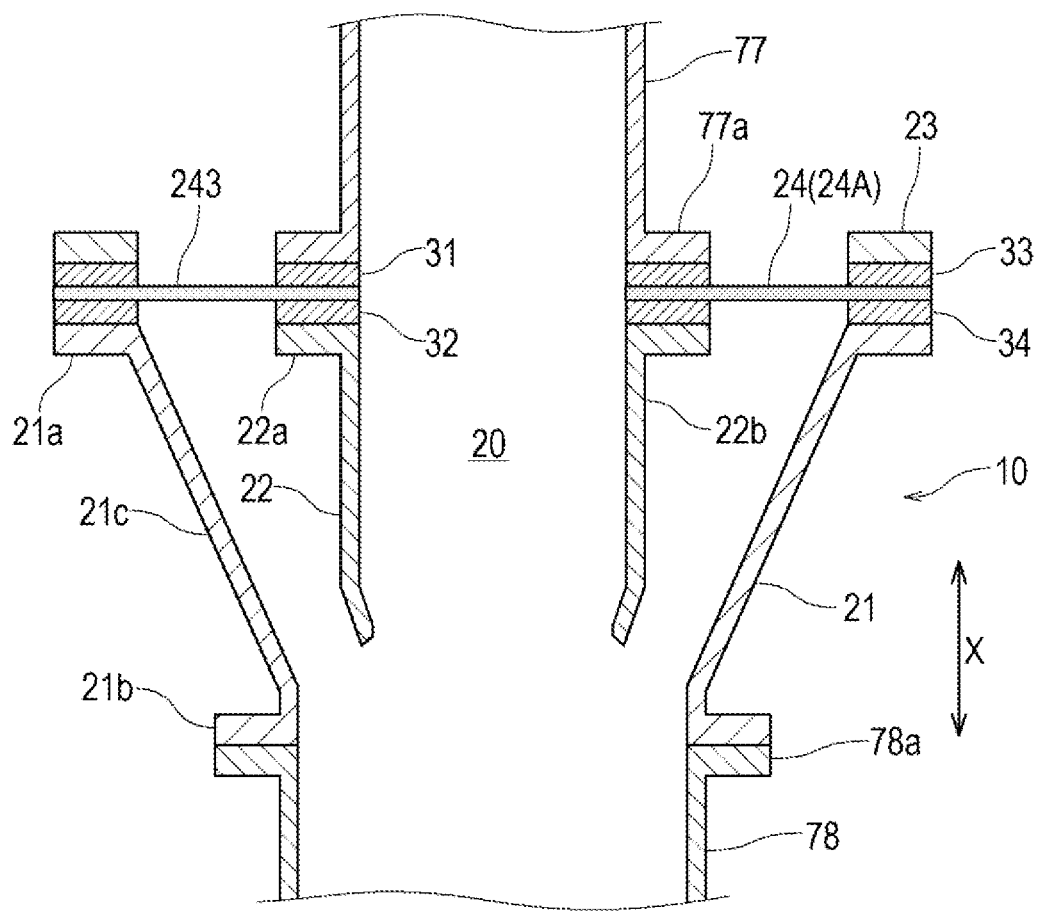
FIG. 4 is an end view of a cut portion where the expansion pipe joint employing the closing member according to a first modification is cut along a plane passing through a central axis.
Figure 5:
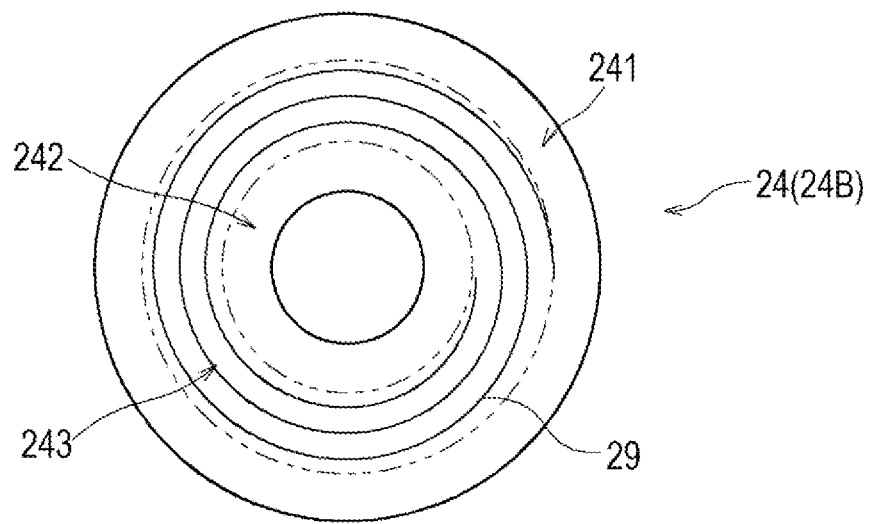
FIG. 5 is a view of the closing member according to a second modification as viewed from the axial direction.

However, the shape of the expansion and contraction portion 243 is not limited to the bellows shape. For example, as shown in FIG. 4, if a surface material of the expansion and contraction portion 243 of the closing member 24 (24A) is made from rubber or resin having elasticity, the expansion and contraction portion 243 may be planar. Further, for example, as shown in FIG. 5, the expansion and contraction portion 243 of the closing member 24 (24B) may have a spiral core material 29 attached to the surface material made from rubber, resin, or cloth. In this case, the surface material of the expansion and contraction portion 243 may be bent in the radial direction between the core materials 29 to provide a margin for expansion and contraction. Note that the core material 29 may be attached to the surface material in a form, such as a mesh, instead of a spiral.

As described above, the incineration ash treatment facility 7 according to the present embodiment includes the crusher 75 that is a vibration device for processing incineration ash, a pipe (the fixed pipe 77) that sends the incineration ash to the crusher 75, and the expansion pipe joint 10 provided between the outlet of the pipe and the inlet (the vibration pipe 78) of the crusher 75. Then, the expansion pipe joint 10 according to the present embodiment is the expansion pipe joint 10 that absorbs displacement occurring at the connection portion between the fixed pipe 77 that is the upstream pipe and the vibration pipe 78 that is the downstream pipe, and includes the outer tube 21 that has a downstream end coupled to the vibration pipe 78, the inner tube 22 that is inserted into the outer tube 21 and has an upstream end coupled to the fixed pipe 77, and the closing member 24 having elasticity provided between the upstream end of the outer tube 21 and the upstream end of the inner tube 22 so as to close the gap between them. Then, in a state where the fixed pipe 77 and the vibration pipe 78 are stationary, the position in the axial direction X of the upstream end of the outer tube 21 and the position in the axial direction X of the upstream end of the inner tube 22 are substantially the same. However, at the connection portion between the fixed pipe 77 and the vibration pipe 78 described above, the powdery and/or granular conveyed object is conveyed by gravity.

In the expansion pipe joint 10 having the above configuration, the closing member 24 is in a plane orthogonal to the axial direction X of the expansion pipe joint 10. Furthermore, the closing member 24 is located at the farthest position in the axial direction X from the lower flange 21b of the outer tube 21 forming the downstream end of the expansion pipe joint 10. The closing member 24 and the conveyed object do not contact each other until the conveyed object fills the expansion pipe joint 10. Therefore, contact between the closing member 24 and the conveyed object and friction caused by such contact can be avoided as much as possible.

As described above, the distance in the axial direction X between the closing member 24 and the downstream end of the expansion pipe joint 10 is made larger, so that contact between the conveyed object that overflows from the vibration pipe 78 into the expansion pipe joint 10 and the closing member 24 can be avoided, and physical, chemical, and thermal influences that the closing member 24 receives from the conveyed object can be suppressed. As a result, physical, chemical, and thermal deterioration of the closing member 24 can be suppressed. This makes it possible to extend the service life of the expansion pipe joint 10 as compared with a conventional expansion pipe joint having a bellows provided on an outer side of the inner tube.

Figure 6:
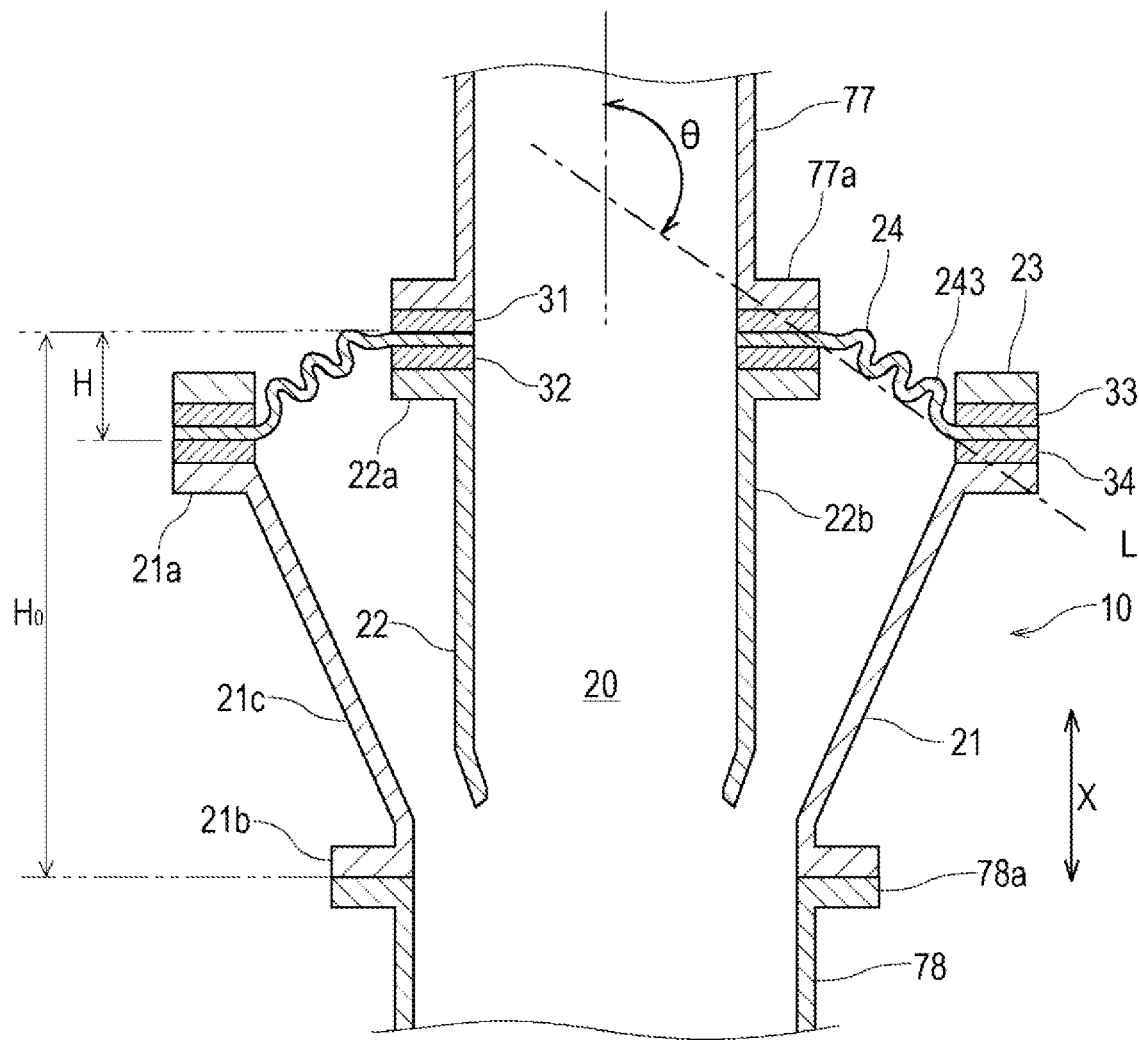
FIG. 6 is an end view of a cut portion where an expansion pipe joint in which a height position of an outer tube is different from an inner tube is cut along a plane passing through a central axis.

Note that, from the viewpoint of suppressing the dimension in the axial direction X of the expansion pipe joint 10, the position in the axial direction X of the upper flange 22a of the inner tube 22 of the expansion pipe joint 10 and the position in the axial direction X of the upper flange 21a of the outer tube 21 are preferably substantially the same in a state where the vibration pipe 78 is stationary. However, the present invention is not limited to the configuration where the position in the axial direction X of the upper flange 22a of the inner tube 22 and the position in the axial direction X of the upper flange 21a of the outer tube 21 are strictly the same. That is, as shown in FIG. 6, a bus line L of the closing member 24 is inclined by θ° from the axial direction X by a difference between the position in the axial direction X of the upstream end of the outer tube 21 and the position in the axial direction X of the upstream end of the inner tube 22, and, as long as θ° is within a predetermined range, deterioration of the closing member 24 can be suppressed. Note that the bus line L of the closing member 24 can be defined by a straight line connecting an outer peripheral edge of the inner mounting portion 242 and an inner peripheral portion of the outer mounting portion 241 on one main surface (a lower surface in FIG. 6) of the closing member 24.

The range of the inclination θ° from the axial direction X of the bus line L of the closing member 24 can be determined according to a situation where the expansion pipe joint 10 is installed. For example, as shown in FIG. 6, with respect to the overall dimension $H_0$ in the axial direction X of the expansion pipe joint 10, in a case where the conveyed object tends to be accumulated up to about $3/5$ $H_0$ from a downstream end surface defining the downstream end of $H_0$, a dimension H in the axial direction X of the closing member 24 may be about $1/5$ of the overall dimension $H_0$ in a state where the vibration pipe 78 is stationary. Note that the overall dimension $H_0$ in the axial direction X of the expansion pipe joint 10 may be the dimension in the axial direction X from the downstream end of the outer tube 21 to the upstream end (the inner mounting portion 242) of the closing member 24. Further, the dimension H in the axial direction X of the closing member 24 may be the dimension in the axial direction X from the downstream end (the outer mounting portion 241) to the upstream end (the inner mounting portion 242) of the closing member 24.

Further, as described above, since the distance between the closing member 24 and the downstream end of the expansion pipe joint 10 is long in the axial direction X, a gap where no conveyed object is present is maintained between the inner tube 22 and the outer tube 21 of the expansion pipe joint 10 and in the vicinity of the closing member 24. In view of the above, the expansion pipe joint 10 according to the present embodiment effectively uses this gap.

As shown in FIG. 2, in the expansion pipe joint 10, a pipe 28 is connected to a portion between the upstream end and the central portion in the axial direction X of the outer tube 21. The pipe 28 can function as a supply pipe that supplies a fluid between the outer tube 21 and the inner tube 22 and/or a discharge pipe that discharges a fluid from between the outer tube 21 and the inner tube 22. The pipe 28 is preferably connected to a position close to the upper flange 21a in the body 21c of the outer tube 21.

By using the pipe 28 and supplying air between the inner tube 22 and the outer tube 21, the inside of the expansion pipe joint 10 can be pressurized and clogging of the expansion pipe joint 10 can be eliminated. Further, the pipe 28 is used to supply powder or liquid chemical substances (medicine, and the like) between the inner tube 22 and the outer tube 21, so that the conveyed object can also be modified or the environment of the conveyance path 20 can also be changed. Furthermore, the pipe 28 is used to introduce and discharge air between the inner tube 22 and the outer tube 21 and in the vicinity of the closing member 24, so that physical, chemical, and thermal effects that the atmosphere of the closing member 24 has on the closing member 24 can also be suppressed.

Further, in the expansion pipe joint 10, an observation window 27, which is one of internal monitoring systems, is provided between the upstream end and the central portion in the axial direction X of the outer tube 21. The observation window 27 is fitted with glass having a function (for example, an antistatic function) for preventing adhesion of a conveyed object, dust, and the like. The observation window 27 is preferably provided at a position close to the upper flange 21a in the body 21c of the outer tube 21.

By using this observation window 27, the inside of the expansion pipe joint 10 that has conventionally been a black box can be observed from the outside of the expansion pipe joint 10. For example, the degree of wear of the closing member 24 can be checked through the observation window 27 without disassembling the expansion pipe joint 10. Note that the internal monitoring system is not limited to the observation window 27 as long as the internal monitoring system allows a state between the outer tube 21 and the inner tube 22 to be observed and monitored. For example, instead of the observation window 27, a monitoring system, such as a camera for capturing an image of the state between the outer tube 21 and the inner tube 22 or a temperature detector, may be provided between the upstream end and the central portion in the axial direction X of the outer tube 21.

Although the preferred embodiments of the present invention are described above, modifications of details of the specific structure and/or function details of the above-described embodiments may be included in the present invention without departing from the spirit of the present invention.

INDUSTRIAL APPLICABILITY

The expansion pipe joint according to the present invention is not limited to the above embodiment, and is widely applicable to an expansion pipe joint that absorbs displacement occurring between connected pipes at a connection portion provided in a location where a conveyed object is conveyed by gravity in a pipe system that conveys powdery and granular conveyed objects.

REFERENCE SIGNS LIST 7 incineration ash treatment facility
10 expansion pipe joint
20 conveyance path
21 outer tube
21a upper flange
21b lower flange
21c body
22 inner tube
22a upper flange
22b body
23 fixing ring
24 closing member
241 outer mounting portion
242 inner mounting portion
243 expansion and contraction portion
27 observation window
28 pipe (supply pipe and/or discharge pipe)
29 core material
25 intrusion prevention member
31 to 34 gasket
74 conveyor
75 crusher
76 hopper
77 fixed pipe (upstream pipe)
77a outlet flange
78 vibration pipe (downstream pipe)
78a inlet flange

The invention claimed is:

1. An expansion pipe joint that absorbs displacement occurring at a connection portion between an upstream pipe and a downstream pipe, the expansion pipe joint comprising:

an outer tube having an upper flange at an upstream end of the outer tube, a lower flange at a downstream end of the outer tube and having a smaller inner diameter than the upper flange, and a body having a tapered shape and connecting the upper flange and the lower flange, and the lower flange coupled to the downstream pipe;

an inner tube with an open upstream end and an open downstream axial end configured to pass through a powdery and/or granular conveyed object by gravity, wherein the inner tube is interior to the outer tube and has an upper flange at the open upstream end that is coupled to the upstream pipe; and a closing member with elasticity and between the upper flange of the outer tube and the upper flange of the inner tube to close a gap between the upper flange of the outer tube and the upper flange of the inner tube, wherein a position in an axial direction of the upstream end of the outer tube and a position in the axial direction of the open upstream end of the inner tube are substantially the same, a dimension position in an axial direction of the open downstream axial end of the inner tube is above a position in the axial direction of the downstream end of the outer tube, and a gap in a radial direction exists between the open downstream axial end of the inner tube and the downstream end of the outer tube.

2. The expansion pipe joint according to claim 1, wherein a supply pipe for supplying a fluid between the outer tube and the inner tube and/or a discharge pipe for discharging a fluid from between the outer tube and the inner tube is connected to a portion between the upstream end and a central portion in the axial direction of the outer tube.

3. The expansion pipe joint according to claim 1, wherein an internal monitoring system is between the upstream end and a central portion in the axial direction of the outer tube.

4. The expansion pipe joint according to claim 1, further comprising an intrusion prevention member that closes a gap between the outer tube and the inner tube and prevents the conveyed object from intruding the gap between them.

5. An incineration ash treatment facility, comprising:
a vibration device for treating incineration ash;
a pipe for sending the incineration ash to the vibration device; and
the expansion pipe joint according to claim 1 between an outlet of the pipe and an inlet of the vibration device.

* * * * *